W. H. CUSHING.
PROCESS FOR STORING AND CURING ENSILAGE.
APPLICATION FILED DEC. 18, 1918.

1,390,341.

Patented Sept. 13, 1921.

INVENTOR
Wm H. Cushing
BY
George Y. Thorpe
ATTORNEY

UNITED STATES PATENT OFFICE.

WILLIAM H. CUSHING, OF TOPEKA, KANSAS, ASSIGNOR OF ONE-THIRD TO JOSEPH H. MERCER AND ONE-SIXTH TO PAUL J. McBRIDE, BOTH OF TOPEKA, KANSAS.

PROCESS FOR STORING AND CURING ENSILAGE.

1,390,341.     Specification of Letters Patent.     Patented Sept. 13, 1921.

Application filed December 18, 1918. Serial No. 267,368.

*To all whom it may concern:*

Be it known that I, WILLIAM H. CUSHING, a citizen of the United States, residing at Topeka, in the county of Shawnee and State of Kansas, have invented certain new and useful Improvements in Processes for Storing and Curing Ensilage, of which the following is a specification.

This invention relates to a method of and apparatus for storing and curing ensilage and the like, and its object is to produce a silo in which, corn, hay, grass and other ensilage which must ferment, may be placed and any excess of moisture removed, and also a silo in which may be placed alfalfa and other ensilage in which fermentation must not take place, and which to be cured and kept in good condition must be thoroughly dried and all moisture removed.

Another object is to produce apparatus for carrying this process into effect which can be manufactured and installed at comparatively small expense and which will not require the services of an expert to operate or keep in repair.

With the objects named in view and others hereinafter pointed out, the invention consists in certain novel and useful combinations of parts as hereinafter described and claimed; and in order that it may be fully understood reference is to be had to the accompanying drawing, in which:

Figure 1:
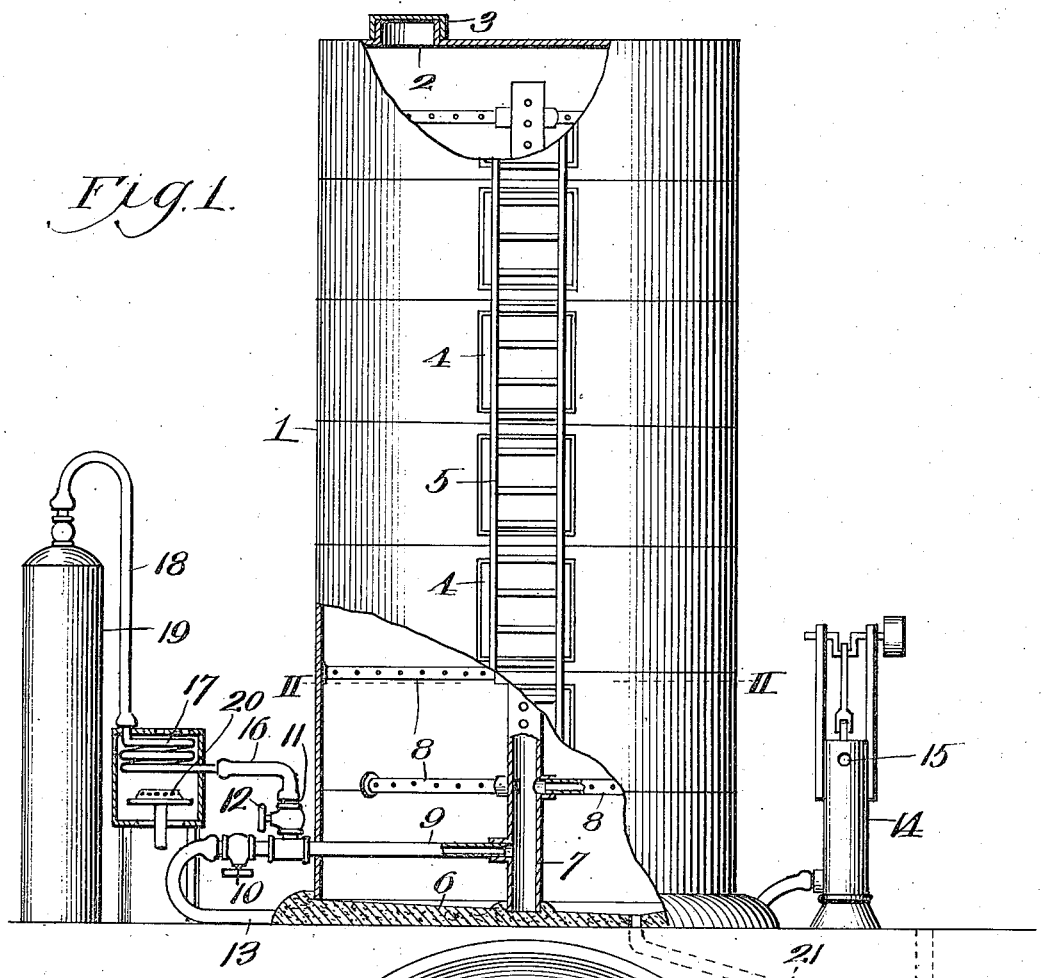
Figure 1, is a side view, partly in central vertical section, of an apparatus embodying the invention.
Figure 2:
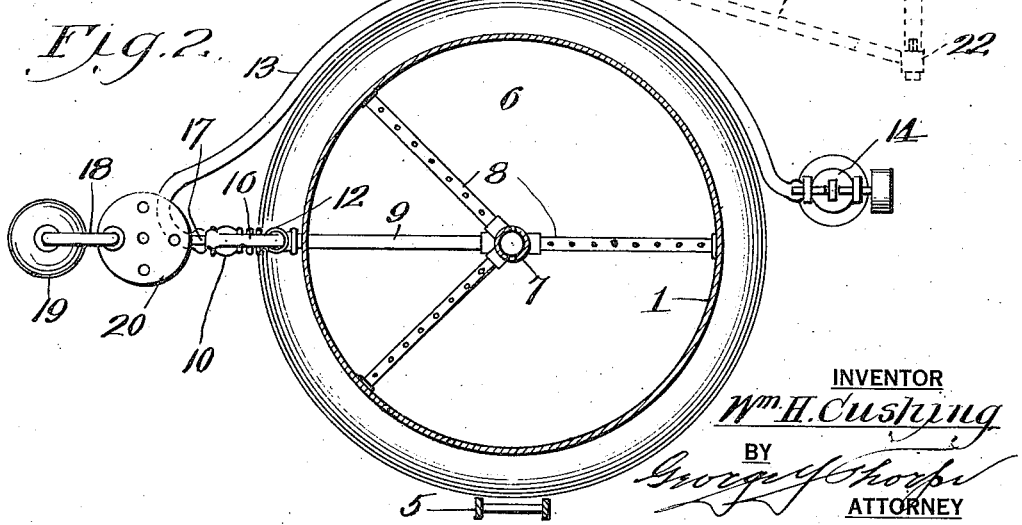
Fig. 2, is a horizontal section taken on the line II—II of Fig. 1.

In the said drawing, where like reference characters identify corresponding parts, 1 indicates a silo, 2 a manhole in the top for the filling of the silo, and 3 a removable air tight cap for the manhole.

The silo is preferably built of steel plates formed in circular sections set one on top of the other and bolted together with an air tight relation, each section having the customary door 4 which fits in its frame with an air tight joint, and 5 is the customary ladder on the side of the silo so that the doors may be opened for the removal of the ensilage or to permit access to the filling cap 3 in the top of the silo.

The lower section of the silo will preferably be set in a concrete base 6 with an air tight relation. Embedded in the center of the concrete base and closed thereby is a vertical perforated pipe 7, as shown, with radiating perforated arms 8, which are fastened to the sides of the silo and act as braces both for the vertical pipe in the center and the sides of the silo sections.

Near the bottom of the central vertical pipe 7 is connected a pipe 9, leading to the exterior of the silo and having its end closed by a hand valve 10. Between the silo and the valve 10 is a branch pipe 11, provided with a hand valve 12.

A hose 13 is connected to the valve 10 and leads to a suction pump 14, by which the air in the silo may be exhausted through the perforated central pipe 7 and its perforated radial arms 8 into the atmosphere through the exhaust port 15 of the pump, when the doors and the filling manhole are shut, and the valve 11 is closed.

Connected to the valve 11 is a hose 16 leading to a heating coil 17, the other end of the coil being connected to a hose 18 leading to a compressed air tank 19. The coil 17 may be heated when desired by a gas burner 20 or in any other suitable manner.

When the air in the tank has been exhausted by the suction pump as described, and the valve 10 is closed, the valve 12 may be opened and the compressed air in the tank will rush into the silo. When desired, to hasten the drying of the contents of the silo, this dry compressed air may be heated as it passes through the coil 17, although under ordinary conditions it is believed that the dry compressed air alone will secure the desired results.

In case the contents of the silo, when first placed therein contain a great amount of moisture, I prefer to have the concrete base sloped so that any water settling to the bottom of the tank will flow out through the drain pipe 21 provided with a hand valve 22, although the valve 22 will normally be closed to prevent the entrance of air into the silo except by the means provided and described above.

The pipe 21 and valve 22 will be underground if the silo is erected upon the ground, as customary, the pipe 21 leading to a drain ditch, not shown.

The advantages of a silo of this character lie in the fact that with ensilage which must be allowed to ferment before use, it may be placed in the silo even when in an extremely moist condition, and this excess of moisture may be drawn off by exhausting the air by means of the suction pump through the central perforated pipe and its radiating arms. After the air has been partially exhausted, a partial vacuum being formed, compressed air is allowed to rush into the tank. Compressed air is, at least theoretically, dry air, and upon its entrance into the silo will tend to absorb a certain percentage of the moisture remaining in the ensilage, and to aid in this process the compressed air may be heated before its admittance into the silo, and before it passes up through the central pipe and its radiating arms and out through the perforations of the same. With ensilage of such character that fermentation must take place before it is used, this process of removing the moisture from the contents of the silo must be stopped before fermentation begins as it would be detrimental to the contents of the silo to remove the gases which are given off during fermentation.

With alfalfa and other ensilage which must not be allowed to ferment, and which have heretofore been dried in the field before being placed in the silo, my process presents a very efficient and highly desirable method of artificially curing the alfalfa after it has been placed in the silo. When a silo of this character is filled with alfalfa, the process of exhausting the silo and then allowing compressed air, or heated compressed air, to enter the same, will be carried out from time to time, as in this case the process of fermentation must be prohibited and the process of exhausting the moisture and permitting the entrance of compressed air, will be continued as long as there is moisture present in the silo.

It will also be apparent that this process for use with fruits, vegetables, etc., which may be placed in storage and from whose container it may be desirable to withdraw the moisture, may be used to a great advantage, by exhausting the air which will withdraw a percentage of moisture, and then permitting the entrance of compressed air, which being practically dry, will soon dry the contents of the container, this process being repeated from time to time as moisture forms within the container.

From the above description it will be apparent that I have produced a process of and apparatus for carrying out the objects enumerated, which while I have illustrated and described what now appears to be the preferred form, I wish it to be understood that I reserve the right to make all changes falling within the spirit and scope of the appended claims.

I claim:

1. The process of curing fresh vegetable matter, consisting in placing such matter in a substantially air-tight chamber and in discharging compressed air into the chamber and in effecting the removal from the chamber of liquid produced by the drying of the vegetable matter by the action of the compressed air thereon.

2. The process of curing fresh vegetable matter, consisting in placing such matter in a substantially air-tight chamber; in discharging heated compressed air into said chamber; and in effecting the removal from the chamber of liquid produced by the drying of the vegetable matter by the action of the compressed air thereon.

3. The process of curing fresh vegetable matter, consisting in placing such matter in a substantially air-tight chamber; in evacuating the air from said chamber; in discharging compressed air into the chamber; and in effecting the removal from the chamber of liquid produced therein by the drying of the vegetable matter by the action of the compressed air thereon.

In testimony whereof I affix my signature.

WILLIAM H. CUSHING.